Patented Apr. 21, 1953

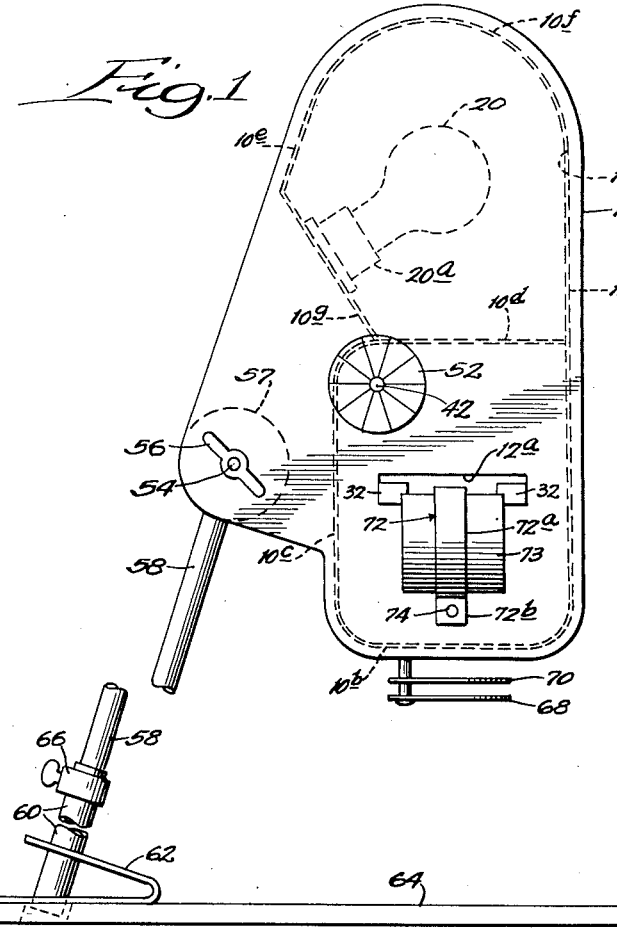

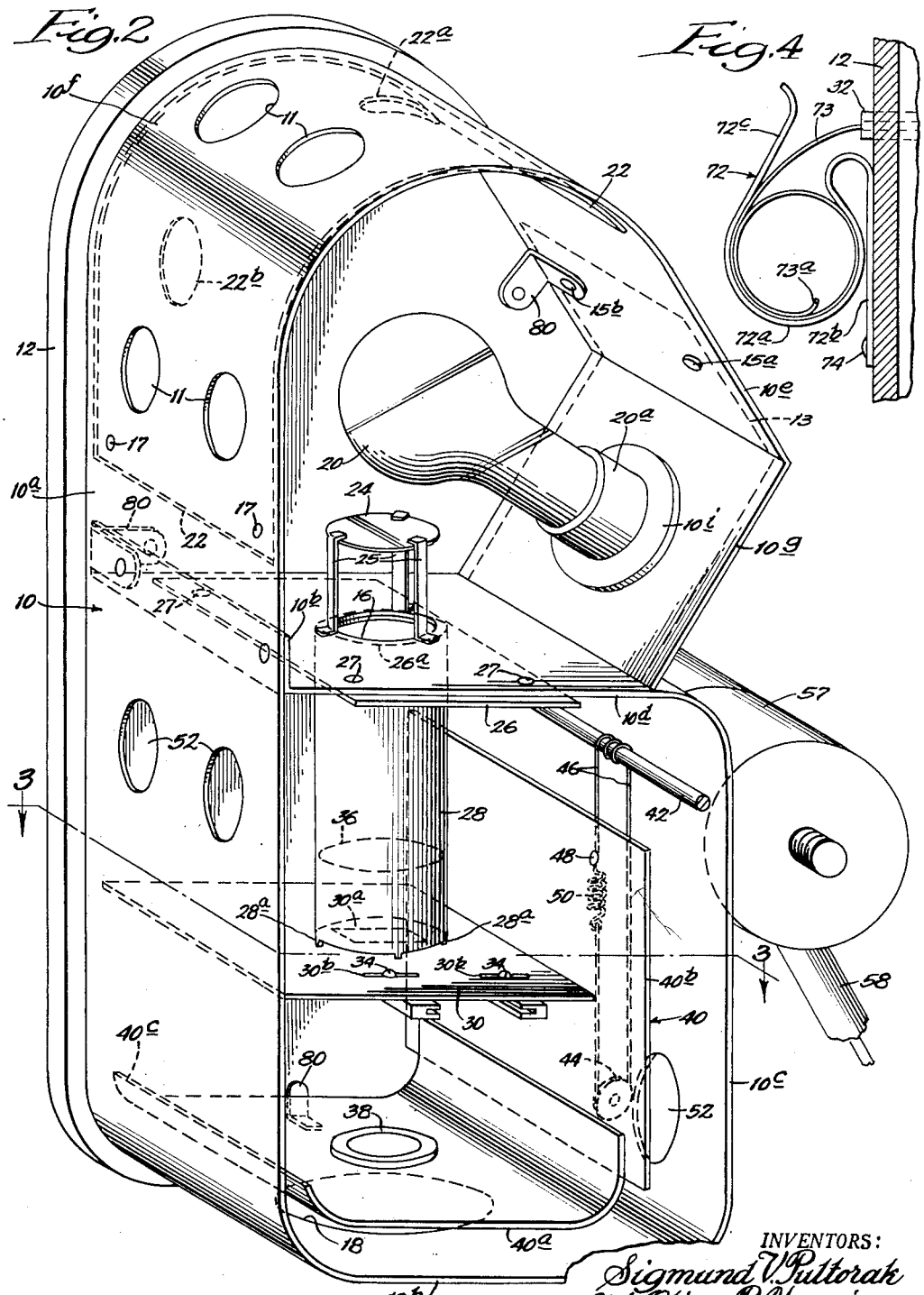

2,635,503

UNITED STATES PATENT OFFICE 2,635,503

FILM STRIP GUIDING STRUCTURE IN PROJECTORS

Oliver P. Horning and Sigmund V. Pultorak, Chicago, Ill.

Application September 12, 1950, Serial No. 184,386

4 Claims. (Cl. 88—28)

Our invention relates to an improved projector of small size, simple construction, and inexpensive manufacture capable of projecting on a suitable screen the images of the successive frames of elongated film.

Sub-miniature cameras take a succession of frames on 8 mm. to 16 mm. film, each frame constituting one exposure or picture. These very small frames cannot be readily viewed in original size and must accordingly be enlarged for printing or study. Because of this necessary enlargement, there is a need for a projector capable of receiving these films and projecting them. However, since the value of the miniature picture resides in part in their economy of film and the utility of such projectors lies largely in their convenience in transportation and use, it is essential to a successful projector of this kind that the projector be inexpensive and small in size, as well as reliable and simple to use.

Moreover, the elongated strip films produced by miniature cameras cannot readily be handled other than in the rolled condition, despite the fact that the film frequently tends to assume a flat rather than a coiled configuration. It is therefore desirable in a projector for use with such film to provide means to coil the film automatically as it issues from the projector, thereby forming the desired coiled conformation without separate coiling or handling operations.

It is therefore a general object of the present invention to provide an improved projector for the successive frames of a small size elongated film.

A more specific object of this invention is to provide a simplified projector loading and fitting mechanism, while at the same time providing for the efficient handling of film strips of a variety of lengths and widths. In this connection it is another specific object of the invention to provide a projector loading and feeding mechanism which maintains the film strips in coils while they are being introduced to or removed from the projector, without requiring complicated and expensive gear mechanisms or other mechanical feeding arrangements.

The novel features which we believe to be characteristic of our invention are set forth with particularity in the appended claims. Our invention itself, however, both as to its construction and mode of operation, together with further objects and advanges thereof, may best be understood by reference to the following description taken in connection with the accompanying drawings, in which:

Figure 1 is a side elevational view of the mechanism of the present invention positioned to project along a vertical axis and with film in place;

Figure 2 is a view in perspective of the mechanism of the present invention oriented to project along a horizontal axis with one side plate removed to show the interior construction;

Figure 3 is a fragmentary cross-sectional view through axis 3—3, Figure 2; and,

Figure 4 is a fragmentary view showing how the film is automatically rolled after passing through the film guide of the structure of Figures 1 to 3.

Referring now to Figures 1 and 2, the projector of the present invention comprises an elongated sheet metal plate 10 sandwiched between a pair of side defining members 12 and 14 of relatively thick wood-like material, such as hardboard. As seen in Figure 2, the plate 10 is bent in figure 8 fashion to define a flat top face 10a, a flat front end wall 10b, a forward bottom portion 10c, and an intermediate chamber-defining wall 10d. The end of the plate 10 is bent over at 10h to define a foot portion which is anchored to the top wall 10a as shown. The rear end of the plate 10 is bent downwardly at 10f in a rounded conformation which terminates in a relatively straight portion 10e. The plate 10 then continues to the wall 10d as shown, this portion being identified at 10g. An L-shaped member 13 is removably attached to the portions 10e and 10g and conforms to the shape thereof as seen in Figure 2. This member carries the lamp 20 and socket 20a and is secured to the plate 10 by the thumb screws 15a and 15b which are accessible from outside the structure. The end of the member 13 opposite the thumb screws rest against wall 10d for support.

Portion 10g of member 10 has a hole 10i which is of sufficient size to receive the socket 20a and the bulb 20 to permit their removal without otherwise altering the structure.

The intermediate wall 10d and the front end wall 10b have aligned centrally disposed apertures 16 and 18 through which light is projected. A parallel beam of light rays is projected through aperture 16 and towards aperture 18 by the lamp 20 which is mounted on the member 13 as shown and has its filament in approximate registry with the aperture 16. Light from this lamp is reflected by the reflector 22 which lines the inner face of the portion 10f of the plate 10 and is collected at lens 24 which produces a beam of substantially parallel rays. The face of lens 24 facing the lamp 20 is ground to diffuse the light from lamp 20.

In addition to acting as a reflector for the light rays from the lamp 20, the reflector 22 aids in removing the heat generated in the lamp compartment. This is due to the fact that the reflector 22 is mounted in spaced relation with the portion 10f of the plate 10 by the rivets 17. Each rivet carries a sleeve of about ⅛ inch thickness interposed between the plates to achieve the necessary spacing to define a passage for cooling air flow. Air flows into this passage through openings 22a and 22b in the reflector and into outer space through the openings 11 in portion 10f of the plate 10. The reflector overlays each of openings 11 and the plate 10 overlays each of openings 22a and 22b to prevent leakage of light.

Lens 24 is supported in spaced relation to the wall 10d by the three support arms 25 which are riveted to the wall 10d and by arcuate end portions which snap over the edges of the lens 24 to hold the same in place.

A plate 26 is attached to the wall 10d by rivets 27 or similar means and held in spaced relation with wall 10d by suitable sleeves on each rivet in the space between the plate 26 and wall 10d. Plate 26 has a centrally disposed aperture 26a in registry with the aperture 16 of the wall 10d.

A sheet metal tube 28 is affixed to plate 26 in registry with the aperture 26a and extends forwardly to approximately the center of the forward compartment of the mechanism. This tube is attached to the plate 26 by the spacers 28a which are soldered respectively to the plate and tube. At its forward end tube 28 receives the plate 30. The plate 30 is similarly soldered to the tube 28 and has a rectangular aperture 30a in registry with the tube 28. This aperture conforms in size and shape to the frames on the film to be projected. Plate 30 is soldered to the tube 28 in a light tight seal and abuts the sides 12 and 14 and the top wall 10a as shown.

The plate 30 receives a pair of transverse members 32 having complementary slots 32a to receive the film. These members are adjustably secured to the plate 30 by the headed pins 34 which ride in the elongated slots 30b of the plate 30. The members 32 extend completely across the unit to define a track for the film from side 12 to side 14. Slots 12a and 14a are provided in the sides 12 and 14 in registry with members 32 to permit insertion and removal of the film as is described in further detail hereafter. The members 32 extend beyond the confines of the housing as shown in Fig. 3 to provide convenient means for adjustment by the operator.

A condenser lens 36 is mounted in tube 28 near the plate 30. This lens causes convergence of the parallel light rays from the lens 24 on the film frame registered with the opening 30a.

A focusing lens 38 is shiftably supported in registry with the apertures 16 and 18 by the L-shaped carriage 40. This carriage is defined by the vertical plate 40a which is attached at its bottom portion to the horizontal plate 40b. The horizontal plate 40b is flat and extends beyond the edges of the vertical plate 40a to ride in the grooves 12b and 14b formed in the side walls 12 and 14, respectively, (Figure 3).

The carriage 40 is shifted by the friction cord drive defined by the transverse shaft 42 extending between side plates 12 and 14, the pulley 44 which is anchored to the bottom plate 10c, and the cord 46. The cord 46 (Figure 2) is wrapped a plurality of turns about the shaft 42 and extends in an endless loop (including spring 50) about pulley 44. The cord is anchored to the portion 40b of the carriage 40 by pin 48 to which the spring 50 is also attached.

The shaft 42 extends through the side 14 and receives the knob 52 (Figure 1). This knob may be turned to rotate shaft 42 and wind the cord 46 to shift the carriage 40 and thus vary the position of lens 38 and focus the image of the film being projected on screens or other objectives at various distances from the unit.

Ventilating openings 52 are provided in the portions 10a and 10c of the plate 10 to define paths for cooling air flow through the front compartment. These openings effectively ventilate the compartment without permitting emission of stray light because the light is confined by the tube 28 up to the film and beyond that point travels in a narrow beam. The vertical portion 40a of the carriage 40 further limits any stray light from this source, since it extends substantially across the unit and has an overhanging portion 40c at its top edge. This member also prevents issuance of stray light from the aperture 18.

The projector unit is adjustably supported from the bolt 54 which is received in mating openings in the side members 12 and 14 and carries thumb nut 56. A pair of cylindrical blocks 57 are received by the bolt 54 intermediate members 12 and 14 and define a split transverse opening to receive the post 58. When the thumb nut 56 is drawn tight, the sides 12 and 14 flex slightly and the post 58 is securely gripped by the blocks 57 to hold the projector in position.

The member 10 is held in the grooves of sides 12 and 14 by the L-shaped brackets 80 which are riveted to the sides 12 and 14 and held to the member 10 by suitable screws and nuts.

Post 58 telescopes post 60, Figure 1, which is removably held on the base 64 by the spring holder 66. The clamping lock 66 holds the posts 58 and 60 in any desired degree of extension. The lamp cord 69 extends through posts 58 and 60 as shown and through a side opening at the bottom of post 60.

When the projector is to be used for enlarging or like purposes, it is locked in the vertical position of Figure 1 to project down on the base 64 as shown. Rotatable red filter 68 and Polaroid filter 70 may be provided to facilitate enlarging operations.

When the projector is to be used for displaying an image for view, the unit is locked in the horizontal position of Figure 2 to project along a horizontal axis to a remote viewing screen. Of course, the projector may be tilted to a nonhorizontal position if it is desired to project along such axis.

One problem associated with the use of long strips of film in a projector or other device resides in the difficulty of handling the film as it issues from the device. In the structure of the present invention, this problem is overcome by the film curlers and holders 72 mounted on the sides 12 and 14 in registry with openings 12a and 14a. These are metal strips having hook-shaped portions 72a and mounting portions 72b. They are rotatably mounted on the sides 12 and 14 by suitable rivets 74.

Each of the film curlers and holders 72 overlays the slot 14a or 12a, as the case may be, and at the point in registry with the film guide defined by rail members 32, slopes at a relatively small angle relative to the axis of the film guide as shown at 72c, Figure 4. When film issues from the film guide formed by the rail members 32, it engages this sloping portion of the corresponding holder 72 and is thereby deflected about the inner face thereof. Continued lateral movement of the film causes the end of the film to curl under the portion leaving the film guide as shown at Figure 4. Continued film motion causes the film to coil further and form an easily handled tight film coil.

The film is indicated at 73, Figure 4, and the coil it forms at 73a.

In addition to coiling the film automatically, the curlers and holders 72 retain the film coils in position on the projector, since the width of each holder is sufficient to hold the film securely and without an undue tendency to tip. Thus, the simple, static, curlers and holders 72 not only wind the film into coils automatically but, in addition, eliminate the need for spools and suitable support mechanism to hold the film coils being unwound.

When, as in inserting a film or in using a film of great length, the curler 72 is in the way or cannot hold all of the film, the curler may be rotated out of registry with the guide 32 and does not then affect the film.

The member 10 may be secured in the side plates 12 and 14 by grooving the inner faces of these plates in conformity with the shape of the member 10. Such grooves are shown at 12c and 14c, Figure 3, and serve to confine member 10 in its desired shape. The bolt 54, carrying thumb nut 56, holds the side plates 12 and 14 against the member 10.

The portion 10g of the plate 10 is tilted at an angle of 45 degrees to the vertical when the projector is horizontal as in Figure 2. When the projector is tilted to the vertical orientation of Figure 1, the portion 10g is also tilted 45 degrees to the vertical. This feature of construction permits the use in a projector designed for both horizontal and vertical projection, of a high intensity type projector bulb of the type that must be operated in a base downward position to prevent the bulb from burning out in a relatively short period of time.

While we have shown and described a specific embodiment of our invention, it will of course be understood that we do not wish to be limited thereto and that many modifications and alternative constructions can be made without departing from the true spirit and scope of our invention. We therefore intend by the appended claims to cover all modifications and alternative constructions falling within the true spirit and scope thereof.

What we claim as new and desire to secure by Letters Patent of the United States is:

1. In a projector, the combination comprising a housing having two slots therein through which a film strip can enter and leave said housing, means within said housing for guiding said strip between said slots adapted to permit said strip to slide freely therealong upon the application of force to a portion of said strip extending outside of said housing, and a hook-shaped holder mounted adjacent each of said slots on the outside of said housing and having a free end over-laying the adjacent slot to direct film issuing therefrom to a curled configuration within said holder and to hold film entering said slots in a similar curled configuration, at least one of said holders being movably mounted so that said free end can be moved out of alignment with the adjacent slot for the insertion of film strips therein, and both of said holders being open ended to permit the film coil therein to be grasped between the thumb and fingers of one hand for manually rotating said coil to move said strip through said housing.

2. In a projector, the combination comprising a housing having two slots therein through which a film strip can enter and leave said housing, means within said housing for guiding said strip between said slots adapted to permit said strip to slide freely therealong upon the application of force to a portion of said strip extending outside of said housing, and a hook-shaped holder mounted adjacent each of said slots on the outside of said housing and having a free end overlaying the adjacent slot to direct film issuing therefrom to a curled configuration within said holder and to hold film entering said slots in a similar curled configuration, at least one of said holders being rotatably mounted so that said free end can be moved out of alignment with the adjacent slot for the insertion of film strips therein, and both of said holders being open ended to permit the film coil therein to be grasped between the thumb and fingers of one hand for manually rotating said coil to move said strip through said housing.

3. In a projector, the combination comprising a housing having oppositely-disposed slots in the side walls thereof through which a film strip can enter and leave said housing, means within said housing for guiding said strip between said slots adapted to permit said strip to slide freely therealong upon the application of force to a portion of said strip extending outside of said housing, said means including a pair of members adjustably spaced-apart having complementary film-receiving grooves extending between said slots within said housing, and a hook-shaped holder mounted adjacent each of said slots on the outside of said housing and having a free end overlaying the adjacent slot to direct a film strip issuing therefrom to a curled configuration within said holder and to maintain a film strip in a similar curled configuration while entering said housing, said holders being disposed in generally parallel relation to the plane of the issuing and entering film strips, at least one of said holders being rotatably mounted so that said free end can be moved out of alignment with the adjacent slot for the insertion of the film strips into the slot, and both of said holders being open ended to permit the film coil therein to be grasped between the thumb and fingers of one hand for rotating said coil to cause the film strip to move through said housing.

4. In a projector, the combination comprising a housing having oppositely-disposed slots in the side walls thereof through which a film strip can enter and leave said housing, means within said housing for guiding said strip between said slots adapted to permit said strip to slide freely therealong upon the application of force to a portion of said strip extending outside of said housing, said means including a pair of members adjustably spaced-apart having complementary film-receiving grooves extending between said slots within said housing, and a hook-shaped holder mounted adjacent each of said slots on the outside of said housing and having a free end overlaying the adjacent slot to direct a film strip issuing therefrom to a curled configuration within said holder and to maintain a film strip in a similar curled configuration while entering said housing, each of said members being adjustable laterally with respect to said holders to provide selectively film tracks of varying width centered with respect to said holders, said holders being disposed in generally parallel relation to the plane of the issuing and entering film strips, at least one of said holders being movably mounted so that said free end can be moved out of alignment with the adjacent slot for the insertion of the film strips into the slot, and both of said holders being open ended to permit the film coil therein to be grasped between the thumb and fingers of one hand for rotating said coil to cause the film strip to move through said housing.

OLIVER P. HORNING.
SIGMUND V. PULTORAK.

References Cited in the file of this patent

UNITED STATES PATENTS

| Number | Name | Date |
|---|---|---|
| 1,075,789 | Patton | Oct. 14, 1913 |
| 1,288,531 | De Vry | Dec. 24, 1918 |
| 1,814,588 | De Vault | July 14, 1931 |
| 1,927,222 | Shannon | Sept. 19, 1933 |
| 2,026,478 | Lisintzki | Dec. 31, 1935 |
| 2,089,275 | Lindstrom | Aug. 10, 1937 |
| 2,113,845 | Kleerup | Apr. 12, 1938 |
| 2,135,074 | Grant | Nov. 1, 1938 |
| 2,190,294 | Mili | Feb. 13, 1940 |
| 2,214,050 | Fowler | Sept. 10, 1940 |
| 2,258,014 | Kallusch | Oct. 7, 1941 |
| 2,278,367 | Freimann et al. | Mar. 31, 1942 |
| 2,285,915 | Dutton | June 9, 1942 |
| 2,294,622 | Langberg et al. | Sept. 1, 1942 |
| 2,330,709 | Harper et al. | Sept. 28, 1943 |
| 2,333,389 | Ringer | Nov. 2, 1943 |
| 2,468,565 | Marcus et al. | Apr. 26, 1949 |
| 2,485,709 | Davock | Oct. 25, 1949 |